United States Patent
Brumbley et al.

[11] Patent Number: 5,982,913
[45] Date of Patent: Nov. 9, 1999

[54] METHOD OF VERIFICATION USING A SUBSET OF CLAIMANT'S FINGERPRINT

[75] Inventors: Clark Mariston Brumbley, Manchester; Robert George Rahikka, Columbia, both of Md.

[73] Assignee: The United States of America as represented by the National Security Agency, Washington, D.C.

[21] Appl. No.: 08/827,027

[22] Filed: Mar. 25, 1997

[51] Int. Cl.[6] ............................. G06K 9/00; G06K 9/32
[52] U.S. Cl. .................. 382/124; 382/125; 382/296; 382/297
[58] Field of Search ...................... 382/124, 125, 382/296, 297, 216; 356/71

[56] References Cited

U.S. PATENT DOCUMENTS

| | | | |
|---|---|---|---|
| 4,015,240 | 3/1977 | Swonger et al. | 340/146.3 E |
| 4,394,773 | 7/1983 | Ruell | 382/124 |
| 4,581,760 | 4/1986 | Schiller et al. | 382/124 |
| 4,641,350 | 2/1987 | Bunn | 382/124 |
| 4,805,223 | 2/1989 | Denyer | 382/124 |
| 5,067,162 | 11/1991 | Driscoll, Jr. et al. | 382/125 |
| 5,144,680 | 9/1992 | Kobayashi et al. | 382/124 |
| 5,239,590 | 8/1993 | Yamamoto | 382/124 |
| 5,261,008 | 11/1993 | Yamamoto | 382/124 |
| 5,267,324 | 11/1993 | Kumagai | 382/124 |
| 5,363,453 | 11/1994 | Gagne et al. | 382/125 |
| 5,509,083 | 4/1996 | Abtahi et al. | 382/124 |
| 5,631,972 | 5/1997 | Ferris et al. | 382/125 |

*Primary Examiner*—Andrew W. Johns
*Assistant Examiner*—Monica S. Davis
*Attorney, Agent, or Firm*—Robert D. Morelli

[57] ABSTRACT

The present invention is a method of fingerprint verification that includes the steps of capturing a complete fingerprint of a number of enrollees; capturing a portion of a claimant's fingerprint, where the portion is less than an entire fingerprint; dividing the portion of the claimant's fingerprint into a number of segments; comparing each of the segments against the fingerprint of the enrollee the claimant claims to be; generating a correlation score for each of the segments; calculating a distance error for the segments; combining the distance errors into an average distance error; generating a verification vector based on each of the correlation scores for each of the segments and the distance error; establishing a threshold vector; and comparing the verification vector against the threshold vector in order to determine whether or not the claimant is the enrollee the claimant claims to be.

20 Claims, 3 Drawing Sheets

METHOD OF VERIFICATION USING A SUBSET OF CLAIMANT'S FINGERPRINT

FIELD OF THE INVENTION

The present invention relates to image analysis and, more particularly, to a method of verification using a subset of a claimant's fingerprint.

BACKGROUND OF THE INVENTION

The skin on a person's palms and soles differs from the skin on other parts of a person's body. This skin is covered by rows of narrow ridges. The patterns formed by these ridges appear to be unique to each person. A ridge on a finger can stop, start, and/or bifurcate (i.e., branch). These characteristics are called minutia.

Fingerprint verification is different from fingerprint identification. In a verification system, the claimant claims to be a particular person and the claimant's fingerprint is compared against the fingerprint of the person the claimant claims to be. A determination is then made as to whether or not the claimant is who the claimant claims to be. A fingerprint identification system compares a fingerprint to a number of fingerprints in order to determine if the first fingerprint matches any of the other fingerprints. If a match is made, the first fingerprint is identified as the person to which it matches. Fingerprint verification is less computationally intensive than fingerprint identification and is, therefore, more appropriate for low-cost applications.

Prior art methods of verification using fingerprints appear to fall into one of the following three categories: comparing the entire fingerprint of a claimant to a stored file of an entire fingerprint of the person the claimant claims to be (i.e., an enrollee); extracting characteristic minutia from the fingerprint of the claimant and comparing it to a stored file containing the minutia of the enrollee the claimant claims to be; and comparing the entire fingerprint of the claimant against a stored file of the enrollee the claimant claims to be that contains less than an entire fingerprint of the enrollee.

Comparing a claimant's entire fingerprint against an enrollee's entire fingerprint is not cost effective in low-cost applications (e.g., car-door entry systems, smart-card or PCMCIA card systems, etc.) mostly because of the size and expense of the scanner required to capture an entire fingerprint and partly because of the amount of memory required to store and process the claimant's entire fingerprint.

Extracting characteristic minutia from the claimant is compute intensive and, possibly, memory intensive. Therefore, this approach may also be impractical for low-cost applications for the same reasons as listed above.

Some fingerprint verification systems reduce the amount of information stored, but such systems are only practical in applications where it is acceptable to have a false acceptance error rate higher (i.e., declaring a match when no such match should be declared) than that obtained by a system using an entire fingerprint. A false rejection error is declaring no match when a match should be declared. There is a need for a method of fingerprint verification that may be implemented in a low-cost application that has an acceptable false acceptance error rate.

U.S. Pat. No. 4,015,240, entitled "PATTERN RECOGNITION APPARATUS," discloses a fingerprint verification device that captures an entire fingerprint image by scanning in every section of the entire fingerprint image and storing the various sections in storage registers. The present invention does not capture the entire fingerprint image of the claimant. U.S. Pat. No. 4,015,240 is hereby incorporated by reference into the specification of the present invention.

U.S. Pat. No. 4,581,760, entitled "FINGERPRINT VERIFICATION METHOD," discloses a method of comparing the entire fingerprint of a claimant to a subset of an enrollee's fingerprint in order to determine if the claimant is the enrollee the claimant claims to be. The method of U.S. Pat. No. 4,581,760 reduces the amount of storage required for the enrollees, but it still requires a large input device for capturing the entire fingerprint of the claimant. The present invention does not require the capture of the claimant's entire fingerprint. The present invention offers a cost reduction over the method of U.S. Pat. No. 4,581,760 by not requiring a large input device for capturing an entire fingerprint. The method of U.S. Pat. No. 4,581,760 may also suffer from a higher false acceptance error rate as compared to the present invention. U.S. Pat. No. 4,581,760 is hereby incorporated by reference into the specification of the present invention.

U.S. Pat. No. 4,641,350, entitled "FINGERPRINT IDENTIFICATION SYSTEM," discloses a fingerprint identification device and method that uses a 64×64 element window for capturing the fingerprint of an enrollee and a larger 96×96 element window for capturing the fingerprint of a claimant. U.S. Pat. No. 4,641,350 stores more information for the claimant then it does for the enrollees. The present invention does just the opposite. The present invention stores the entire fingerprint of an enrollee and captures a smaller subset of the claimant's fingerprint. U.S. Pat. No. 4,641,350 is hereby incorporated by reference into the specification of the present invention.

U.S. Pat. No. 4,805,223, entitled "SKIN-PATTERN RECOGNITION METHOD AND DEVICE," also discloses a method of comparing the entire fingerprint of a claimant to a subset of each enrollee's fingerprint in order to attempt to identify the claimant as an enrollee. U.S. Pat. No. 4,805,223 also discloses an alternate embodiment that compares a sparsely sampled entire fingerprint of the claimant to the entire fingerprint of an enrollee. Both embodiments of U.S. Pat. No. 4,805,223 require an input device for capturing the claimant's entire fingerprint. The present invention does not require the capture of the claimant's entire fingerprint. U.S. Pat. No. 4,805,223 is hereby incorporated by reference into the specification of the present invention.

U.S. Pat. No. 5,067,162, entitled "METHOD AND APPARATUS FOR VERIFYING IDENTITY USING IMAGE CORRELATION," and U.S. Pat. No. 5,144,680, entitled "INDIVIDUAL IDENTIFICATION RECOGNITION SYSTEM," each disclose a method of comparing characteristic minutia from the entire fingerprint of a claimant to characteristic minutia from the entire fingerprint of one or more enrollees in order to attempt to identify the claimant as an enrollee. The methods of U.S. Pat. Nos. 5,067,162 and 5,144,680 each require an input device for capturing the entire fingerprint of the claimant. The present invention does not require the capture of a claimant's entire fingerprint. U.S. Pat. Nos. 5,067,162 and 5,144,680 are hereby incorporated by reference into the specification of the present invention.

U.S. Pat. No. 5,239,590, entitled "FINGERPRINT VERIFICATION METHOD," discloses a method of comparing the fingerprint of a claimant to the fingerprint of an enrollee the claimant claims to be in order to attempt to determine whether or not the claimant is the enrollee. U.S. Pat. No. 5,239,590 attempts to reduce the amount of data required to be stored for the enrollees and the claimant by obtaining fingerprint information from the center of characteristic minutia to the tip of the finger. Not knowing before hand where the center of characteristic minutia is, the method of U.S. Pat. No. 5,239,590 still requires the capture of a substantial portion of the claimants fingerprint in order to determine where the center of the characteristic minutia is. The present invention does not require the capture of a substantial portion of the claimant's fingerprint. U.S. Pat. No. 5,239,590 is hereby incorporated by reference into the specification of the present invention.

U.S. Pat. No. 5,261,008, entitled "FINGERPRINT VERIFICATION METHOD," and U.S. Pat. No. 5,267,324, entitled "IMAGE COMPARISON METHOD," both disclose a method of fingerprint verification by capturing an entire fingerprint for both enrollees and claimant, but then dividing these images into smaller sections and comparing the corresponding sections. The present invention does not capture the entire fingerprint image of a claimant. U.S. Pat. Nos. 5,261,008 and 5,267,324 are hereby incorporated by reference into the specification of the present invention.

U.S. Pat. No. 5,363,453, entitled "NON-MINUTIAE AUTOMATIC FINGERPRINT IDENTIFICATION SYSTEM AND METHODS," discloses a method of fingerprint identification that captures an entire fingerprint but then reduces the fingerprint image to an area based on ridge count. The present invention does not capture the entire fingerprint image of a claimant. U.S. Pat. No. 5,363,453 is hereby incorporated by reference into the specification of the present invention.

SUMMARY OF THE INVENTION

It is an object of the present invention to determine if a claimant's fingerprint matches the fingerprint of an enrollee the claimant claims to be, where the enrollee has previously enrolled in the present invention, by capturing a portion of the claimant's fingerprint and comparing it to the entire fingerprint of the enrollee.

It is another object of the present invention to determine if a claimant's fingerprint matches a fingerprint of an enrollee the claimant claims to be by comparing a portion of the claimant's fingerprint to the entire fingerprint of the enrollee, where the captured portion of the claimant's fingerprint is divided into a number of segments.

It is another object of the present invention to determine if a claimant's fingerprint matches the fingerprint of an enrollee the claimant claims to be by comparing a portion of the claimant's fingerprint to the entire fingerprint of the enrollee, where the portion of the claimant's fingerprint is divided into a number of segments, and where information from only a user-definable number of segments are used to determine whether or not a match exists.

It is another object of the present invention to determine if a claimant's fingerprint matches the fingerprint of an enrollee the claimant claims to be by comparing a portion of the claimant's fingerprint to the entire fingerprint of the enrollee, where the captured portion of the claimant's fingerprint is divided into a number of segments, and where the segments are sparsely sampled.

It is another object of the present invention to determine if a claimant's fingerprint matches the fingerprint of an enrollee the claimant claims to be by comparing a portion of the claimant's fingerprint to the entire fingerprint of the enrollee, where a Fast Fourier Transform is used to speed up the comparison process.

The objects of the present invention are achieved by a fingerprint verification method where a claimant claims to be a certain individual, who has previously enrolled in the present invention, and a portion of the claimant's fingerprint is compared against the entire fingerprint of only the enrollee the claimant claims to be.

First, a number of individuals enroll by providing a full fingerprint. Next, a claimant claims to be a particular enrollee. A portion of the claimant's fingerprint is captured. The portion is divided into a number of segments. The location at which each segment is captured is recorded. Each segment is correlated across the entire fingerprint image of the enrollee the claimant claims to be. Each segment is compared to the enrollee fingerprint at each comparison location of the fingerprint of the enrollee the claimant claims to be. A correlation score is generated for each comparison location for each segment. Each segment must also be correlated across a number of rotations of the enrollee fingerprint. The highest correlation score for each segment is selected as the correlation score for each segment. The location at which the highest correlation score is selected for each segment is recorded. The result is that each segment has a capture location, a correlation score, and a correlation location.

Next, a distance error for each combination of segments is calculated. For four segments, there are six combinations (i.e., segment one to segment two, segment one to segment three, segment one to segment four, segment two to segment three, segment two to segment four, and segment three to segment four). A distance error represents the difference between the relationship of a combination of segments as captured and the relationship of the combination of segments as correlated. A number of these distance errors are selected and combined to form an average distance error for all of the segments.

Next, a verification vector for the segments and, therefore, the claimant, is generated that includes the selected correlation scores of the segments and the distance error of the segments.

Finally, the verification vector is compared to a user-definable threshold vector. The threshold vector is a function of correlation score and distance error. If the verification vector is above the threshold vector then the claimant is determined to be the enrollee.

In an alternate embodiment, a fast Fourier Transform may be used to speed up the correlation process. Also, decimation of the fingerprint images (i.e., the discarding of fingerprint data in some reasonable manner such as two pixels out of three) may be employed to reduce the memory requirement and the computation time.

DETAILED DESCRIPTION

The present invention is a fingerprint verification method that enables a user to capture only a portion of a claimant's fingerprint. A claimant is a person who claims to be a certain person. The certain person, called an enrollee, is a person who has provided a complete fingerprint image that may be compared to the portion of the claimant's fingerprint. In a fingerprint verification method, the claimant's fingerprint is compared against only the fingerprint of the enrollee the claimant claims to be. This differs from a fingerprint identification method which compares a presented fingerprint against the entire database of enrollees in order to determine if the presented fingerprint is that of any one of the enrolled fingerprints. Fingerprint verification is more appropriate for low cost biometric systems than is fingerprint identification.

Figure 1:
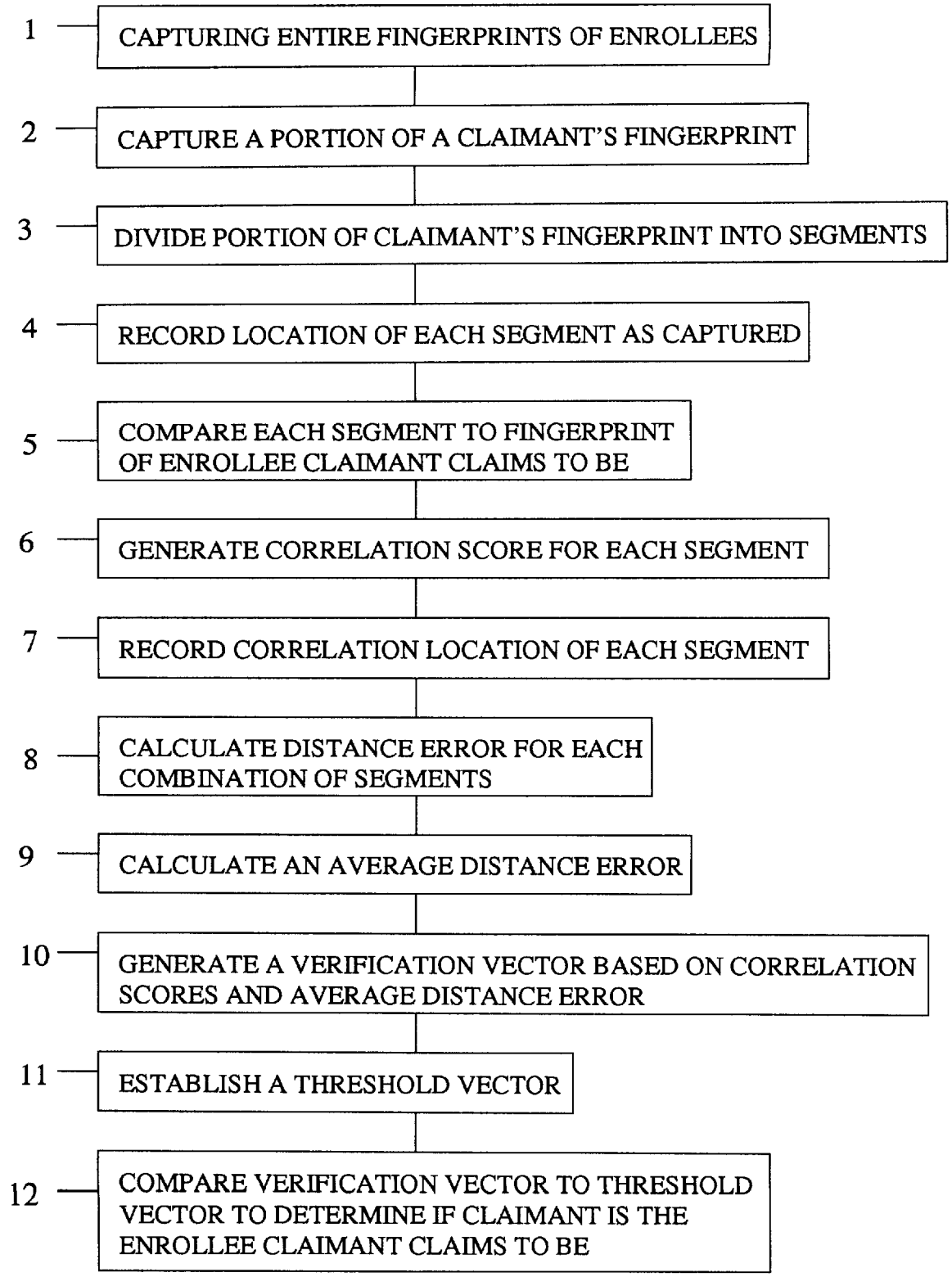
FIG. 1 lists the steps of the present invention.
Figure 2:
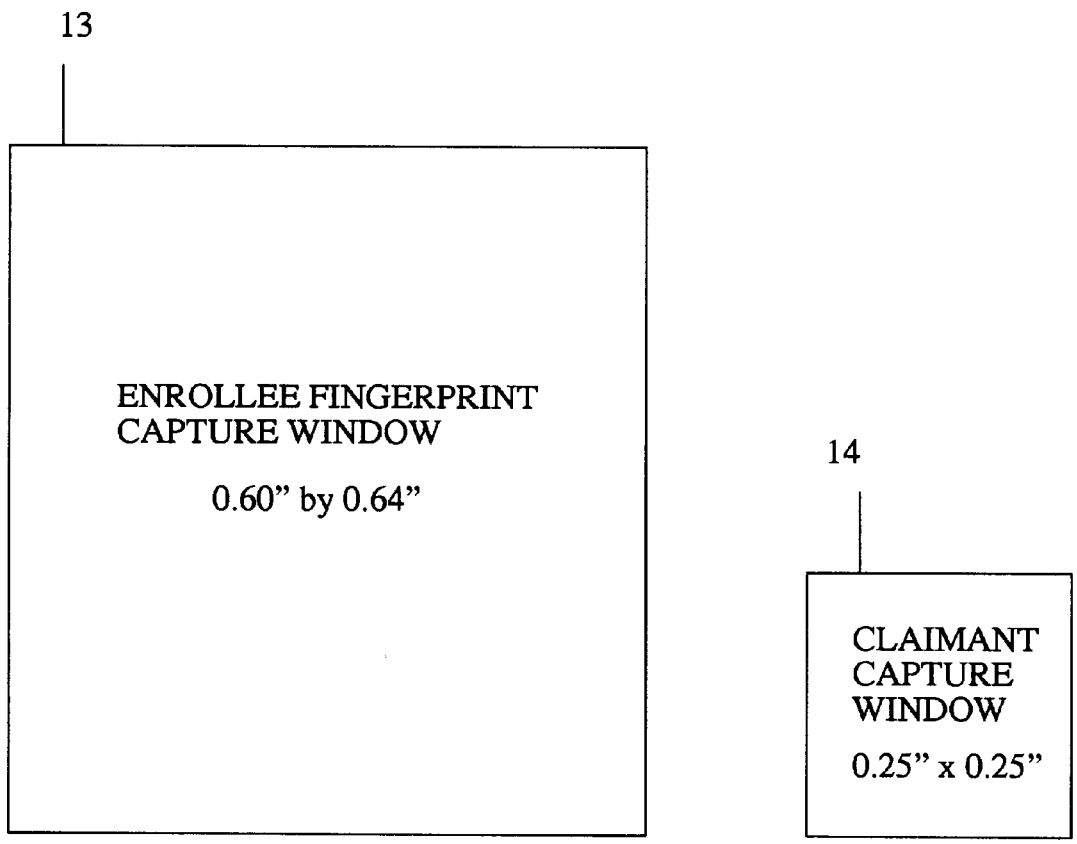
FIG. 2 illustrates a fingerprint capture window for an enrollee and a smaller fingerprint-portion capture window for a claimant.

FIG. 1 illustrates the steps of the present invention. The first step 1 in the present method is to capture the entire fingerprint for each enrollee. A number of individuals known as enrollees enroll their entire fingerprint. FIG. 2 illustrates an enrollee fingerprint capture window 13 for capturing the entire fingerprint of an enrollee. Although many configurations are possible, an enrollee fingerprint capture window that is 0.60 inches by 0.64 inches (or 120 pixels by 128 pixels at 200 dots per inch) is believed to be sufficient for capturing an entire fingerprint. Since relatively few enrollment stations are envisioned as compared to the number of claimant stations, little cost savings may be realized by requiring less than a full fingerprint of each enrollee. The benefit of obtaining the entire fingerprint of the enrollees is that the probability of making a correct verification is increased.

The second step 2 of the present method listed in FIG. 1 is to capture a portion of a claimant's fingerprint. A claimant claims to be a certain enrollee. A portion of the fingerprint of the claimant is captured using the claimant fingerprint-portion capture window 14 illustrated in FIG. 2. Although many configurations are possible, a claimant fingerprint-portion capture window that is 0.25 inches by 0.25 inches (or 50 pixels by 50 pixels at 200 dots per inch) is believed to be sufficient for verifying that a claimant is the enrollee the claimant claims to be. Note that the present invention does not require any particular portion of the claimant's fingerprint to be presented. The present invention is not a minutia based verification method.

By making the claimant fingerprint-portion capture window 14 smaller than the enrollee fingerprint capture window 13, the hardware at the claimant end of the fingerprint verification system may be reduced. By reducing the hardware necessary for capturing a portion of a claimant's fingerprint, the costs at the claimant's end of the system are reduced dramatically. Since there are, typically, many more claimant stations required than enrollee stations, a cost reduction at the claimant end makes a fingerprint verification method affordable for applications that would not otherwise use such a method (e.g., door locks, automatic teller machines, etc.).

The third step 3 of the present method listed in FIG. 1 is to divided the portion of the claimant's fingerprint into segments. The captured portion of the claimant's fingerprint is divided into a number of segments. In the preferred embodiment, the portion is divided into four equal segments of 0.125 inches by 0.125 inches (or 25 pixels by 25 pixels at 200 dots per inch) that are adjacent to one another (i.e., a square made up of four equal square segments). However, the present invention is not restricted to this configuration. That is, the segments may neither be equal in size nor adjacent to each other nor restricted to any particular number.

The fourth step 4 of the present method is to record the location of each segment as captured. Although there are many different ways to record location, the upper left x and y coordinates of each segment as captured is recorded as the capture location of each corresponding segment in the preferred embodiment.

Figure 3:
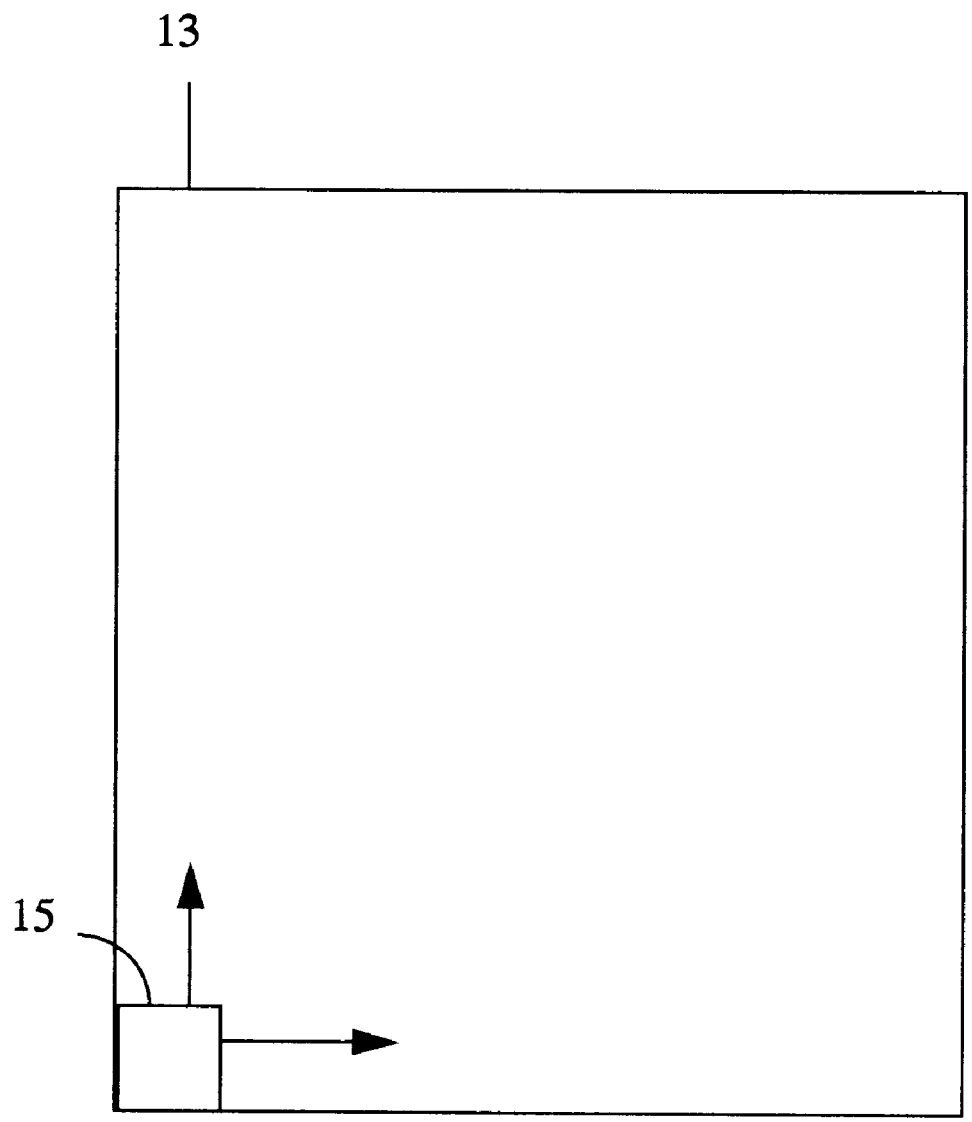
FIG. 3 illustrates a segment of the claimant's fingerprint portion being scanned across an enrollee's fingerprint.

The fifth step 5 of the present method is to compare each segment to the fingerprint of the enrollee that the claimant claims to be. Each of the four segments is correlated one at a time across the entire fingerprint image of the enrollee the claimant claims to be. FIG. 3 illustrates the correlation of one segment 15 across the enrollee's captured fingerprint 13 with the enrollee's captured fingerprint 13 rotated by zero degrees. Each segment 15 is scanned across the enrollee's captured fingerprint 13 one pixel at a time in both the x and y direction until each segment 15 has been compared to the entire fingerprint 13 captured from the enrollee.

The sixth step 6 on the present method listed in FIG. 1 is to generate a correlation score for each segment. An initial correlation score for each segment is generated with respect to the enrollee's fingerprint at each pixel location. That is, a number is generated that indicates the amount of similarity between each segment and the area of the enrollee's fingerprint to which each segment is compared.

Since the captured portion of the claimant's fingerprint may be rotated with respect to the enrollee's fingerprint, each segment must be scanned across a number of rotations of the enrollee fingerprint in addition to the zero degree rotation. Although not limited to the following approach, the preferred embodiment correlates each segment across the enrollee's fingerprint rotated within plus or minus ten degrees of the zero degree rotation at two degree increments for a total of eleven correlations (i.e., −10°, −8°, −6°, −4°, −2°, 0°, +2°, +4°, +6°, +8°, and +10°). An initial correlation score is generated for each segment at each location in each of the eleven rotations.

Next, the highest correlation score obtained for a segment rotation is chosen as the correlation score for that particular segment rotation. A final correlation score is generated for each segment based on the highest correlation scores from all rotations for that particular segment.

The seventh step 7 of the present method is to record the correlation location of each segment. The location at which a segment obtains a final correlation score is recorded as the correlation location for that particular segment. A final correlation score is recorded for each segment. Although there are many ways to record a location, the upper left x and y coordinates of the correlated segment is recorded as the correlation location in the preferred embodiment.

The eighth step 8 of the present method is to calculate a distance error for each combination of segments. Six distance errors are calculated for each combination of the segments. Ideally, the four correlated segments should have the same spatial relationship between every combination of segments as they did when they were captured in the claimant fingerprint-portion capture window (e.g., adjacent to each other). However, the four correlated segments may not be oriented the same as they were in the claimant capture window. That is, the correlation locations of the correlated segments may have a different spatial relationship among themselves than do the capture locations of the captured segments. Therefore, six distance errors are calculated to determine the difference between the spatial relationship of the correlation locations and the captured locations.

Each distance error represents the difference, if any, between the spatial relationship of the correlated locations of a pair of segments and the spatial relationship between the captured locations of the same pair of segments. If four segments are used, six distance errors will be generated, one for each of the following segment combinations: segment one to segment two, segment one to segment three, segment one to segment four, segment two to segment three, segment four to segment two, and segment four to segment three.

Using the x and y coordinate of a segment in the claimant capture window and the x and y coordinate of a segment with the chosen correlation score, the distance error between these two segments is as follows:

$$\text{Distance Error} = ((X_{exp} - X_{corr})^2 + (Y_{exp} - Y_{corr})^2)^{0.5},$$

where $X_{exp}$ is the difference between the x coordinate of the capture location of a first segment and the x coordinate of the capture location of a second segment, where $Y_{exp}$ is the difference between the y coordinate of the capture location of the first segment and the y coordinate of the capture location of the second segment, where $X_{corr}$ is the difference between the x coordinate of the correlation location of the first segment and the x coordinate of the correlation location of the second segment, and where $Y_{corr}$ is the difference between the y coordinate of the correlation location of the first segment and the y coordinate of the correlation location of the second segment. A distance error is calculated for each combination of segments.

The ninth step 9 of the present method is to calculate an average distance error. The distance errors are combined in some fashion. Although not limited to this approach, the three smallest distance errors of the six distance errors generated for four segments are averaged together in the preferred embodiment. The result is used as the average distance error of the four segments.

By averaging the three smallest distance errors, the contribution of one of the four segments is ignored. In the present invention, a valid match may be made even if one segment has a computed position that is significantly in error with respect to the configuration pattern of the remaining three segments. A problem with one of the segments is not fatal to the present invention.

The tenth step 10 of the present method is to generate verification vector based on the correlation scores and the average distance error. A verification vector for the four segments and, therefore, the claimant, is generated that includes the second best correlation scores of the four segments and the distance error of the four segments. Most prior art methods only use a correlation score to characterize the claimant. The present invention uses both a correlation score and an average distance error score to characterize the claimant.

The eleventh step 11 of the present method is to establish a user-definable threshold vector.

The twelfth and last step 12 of the present method is to compare the verification vector to the user-definable threshold vector in order to determine if the claimant is the enrollee the claimant claims to be. The verification score vector is compared to a user-definable threshold vector that includes a correlation component and an average distance error component. If the verification score vector components are each above some function of the threshold components then the present invention recognizes the claimant as the enrollee the claimant claims to be. Empirical data may be used to establish the threshold vector components.

In an alternate embodiment, a fast Fourier Transform may be used to speed up the correlation process. Also, decimation of the fingerprint images (i.e., the discarding of fingerprint data in some reasonable manner such as two pixels out of three) may be employed to reduce the memory requirement and the computation time.

What is claimed is:

1. A method of fingerprint verification, comprising the steps of:
   a) capturing a complete fingerprint of at least one enrollee;
   b) capturing a portion of a claimant's fingerprint, where the portion is less than an entire fingerprint of the claimant, and where the claimant claims to be one of the at least one enrollee;
   c) dividing the portion of the claimant's fingerprint into a plurality of segments;
   d) recording a first location for each of the plurality of segments, where the first location represents the location at which each of the plurality of segments is captured;
   e) comparing each of the plurality of segments against the fingerprint of the at least one enrollee the claimant claims to be;
   f) generating a correlation score for each of the plurality of segments;
   g) recording a second location for each of the plurality of segments, where the second location represents the location at which the correlation score was generated for each of the plurality of segments;
   h) calculating a distance error for each combination of the plurality of segments based on the first location and the second location of each of the plurality of segments;
   i) combining the distance error for each of the plurality of segments into an average distance error for the plurality of segments;
   j) generating a verification vector based on the correlation scores for each of the plurality of segments and the average distance error;
   k) establishing a threshold vector; and
   l) comparing the verification vector against the threshold vector in order to determine if the claimant is the one of at least one enrollee the claimant claims to be.

2. The method of claim 1, wherein said step of capturing a complete fingerprint of at least one enrollee is comprised of capturing a 0.60 inch by 0.64 inch area at 200 dots per inch of a fingerprint of at least one enrollee.

3. The method of claim 1, wherein said step of capturing a portion of a claimant's fingerprint is comprised of capturing a 0.25 inch by 0.25 inch area at 200 dots per inch of a claimant's fingerprint.

4. The method of claim 1, wherein said step of dividing the portion of the claimant's fingerprint into a plurality of segments is comprised of dividing the portion of the claimant's fingerprint into four equal and adjacent segments.

5. The method of claim 1, wherein said step of recording a first location for each of the plurality of segments is comprised of the step of recording the lower left x and y coordinate at which each of the plurality of segments is captured.

6. The method of claim 1, wherein said step of comparing each of the plurality of segments against the fingerprint of the one of the at least one enrollee the claimant claims to be is comprised of the steps of:
   a) correlating each the plurality of segments across the entire fingerprint of the one of the at least one enrollee the claimant claims to be one pixel at a time;
   b) generating an initial correlation score for each of the plurality of segments at each pixel location; and
   c) repeating steps (a) and (b) for at least one rotation of the fingerprint of the one of the at least one enrollee the claimant claims to be.

7. The method of claim 1, wherein said step of generating a correlation score for each of the plurality of segments is comprised of choosing the highest initial correlation score generated for each of the plurality of segments as the correlation score corresponding to each of the plurality of segments.

8. The method of claim 1, wherein said step of recording a second location for each of the plurality of segments is comprised of the step of recording the upper left x and y coordinate at which the correlation score is generated for each of the plurality of segments.

9. The method of claim 1, wherein said step of calculating a distance error for each combination of the plurality of segments is comprised of the step of calculating $$\text{Distance Error} = ((X_{exp} - X_{corr})^2 + (Y_{exp} - Y_{corr})^2)^{0.5}$$

for each combination of the plurality of segments, where $X_{exp}$ is the difference between the x coordinate of the first location of one of the plurality of segments and the x coordinate of the first location of another of the plurality of segments, where $Y_{exp}$ is the difference between the y coordinate of the first location of the one of the plurality of segments used to determine $X_{exp}$ and the y coordinate of the first location of the another of the plurality of segments used to determine $X_{exp}$, where $X_{corr}$ is the difference between the x coordinate of the second location of the one of the plurality of segments used to determine $X_{exp}$ and the x coordinate of the second location of the another of the plurality of segments used to determine $X_{exp}$, where $Y_{corr}$ is the difference between the y coordinate of the second location of the one of the plurality of segments used to determine $X_{exp}$ and the y coordinate of the second location of the another of the plurality of segments used to determine $X_{exp}$.

10. The method of claim 1, wherein said step of combining the distance error for each of the plurality of segments into an average distance error for the plurality of segments is comprised of averaging together the three smallest distance errors.

11. The method of claim 1, wherein said step of generating a verification vector based on the correlation scores for each of the plurality of segments and the average distance error is comprised of generating a verification vector based on the second highest correlation scores for each of the plurality of segments and the average distance error.

12. The method of claim 2, wherein said step of capturing a portion of a claimant's fingerprint is comprised of capturing a 0.25 inch by 0.25 inch area at 200 dots per inch of a claimant's fingerprint.

13. The method of claim 12, wherein said step of dividing the portion of the claimant's fingerprint into a plurality of segments is comprised of dividing the portion of the claimant's fingerprint into four equal and adjacent segments.

14. The method of claim 13, wherein said step of recording a first location for each of the plurality of segments is comprised of the step of recording the upper left x and y coordinate at which each of the plurality of segments is captured.

15. The method of claim 14, wherein said step of comparing each of the plurality of segments against the fingerprint of the one of the at least one enrollee the claimant claims to be is comprised of the steps of:

a) correlating each the plurality of segments across the entire fingerprint of the one of the at least one enrollee the claimant claims to be one pixel at a time;

b) generating an initial correlation score for each of the plurality of segments at each pixel location; and c) repeating steps (a) and (b) for at least one rotation of the fingerprint of the one of the at least one enrollee the claimant claims to be.

16. The method of claim 15, wherein said step of generating a correlation score for each of the plurality of segments is comprised of choosing the highest initial correlation score generated for each of the plurality of segments as the correlation score corresponding to each of the plurality of segments.

17. The method of claim 16, wherein said step of recording a second location for each of the plurality of segments is comprised of the step of recording the upper left x and y coordinate at which the correlation score is generated for each of the plurality of segments.

18. The method of claim 17, wherein said step of calculating a distance error for each combination of the plurality of segments is comprised of the step of calculating $$\text{Distance Error } ((X_{exp} - X_{corr})^2 + (Y_{exp} - Y_{corr})^2)^{0.5}$$

for each combination of the plurality of segments, where $X_{exp}$ is the difference between the x coordinate of the first location of one of the plurality of segments and the x coordinate of the first location of another of the plurality of segments, where $Y_{exp}$ is the difference between the y coordinate of the first location of the one of the plurality of segments used to determine $X_{exp}$ and the y coordinate of the first location of the another of the plurality of segments used to determine $X_{exp}$, where $X_{corr}$ is the difference between the x coordinate of the second location of the one of the plurality of segments used to determine $X_{exp}$ and the x coordinate of the second location of the another of the plurality of segments used to determine $X_{exp}$, where $Y_{corr}$ is the difference between the y coordinate of the second location of the one of the plurality of segments used to determine $X_{exp}$ and the y coordinate of the second location of the another of the plurality of segments used to determine $X_{exp}$.

19. The method of claim 18, wherein said step of combining the distance error for each of the plurality of segments into an average distance error for the plurality of segments is comprised of averaging together the three smallest distance errors.

20. The method of claim 19, wherein said step of generating a verification vector based on the correlation scores for each of the plurality of segments and the average distance error is comprised of generating a verification vector based on the second highest correlation scores for each of the plurality of segments and the average distance error.

* * * * *